(12) United States Patent
Koh et al.

(10) Patent No.: US 9,771,539 B2
(45) Date of Patent: Sep. 26, 2017

(54) SOLID PARTICLE, SOLID LUBRICANT, AND METAL MEMBER

(71) Applicant: DAIKIN INDUSTRIES, LTD., Osaka-shi, Osaka (JP)

(72) Inventors: Meiten Koh, Settsu (JP); Fumiko Shigenai, Settsu (JP); Tomohiro Isogai, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/762,851

(22) PCT Filed: Feb. 6, 2014

(86) PCT No.: PCT/JP2014/052756
§ 371 (c)(1),
(2) Date: Jul. 23, 2015

(87) PCT Pub. No.: WO2014/123185
PCT Pub. Date: Aug. 14, 2014

(65) Prior Publication Data
US 2015/0368577 A1    Dec. 24, 2015

(30) Foreign Application Priority Data

Feb. 6, 2013   (JP) .................... 2013-021498

(51) Int. Cl.
*C10M 171/06* (2006.01)
*C10M 103/06* (2006.01)
(Continued)

(52) U.S. Cl.
CPC ........ *C10M 103/04* (2013.01); *C10M 103/00* (2013.01); *C10M 103/06* (2013.01);
(Continued)

(58) Field of Classification Search
CPC .... C10M 2215/086; C10M 2215/0865; C10M 2201/066; C10M 2215/0663;
(Continued)

(56) References Cited

U.S. PATENT DOCUMENTS 3,717,576 A * 2/1973 Hiratsuka ............ C10M 169/04
508/106
3,856,686 A * 12/1974 Sato ..................... C10M 177/00
508/112
(Continued)

FOREIGN PATENT DOCUMENTS

JP   60225361 A * 11/1985
JP   62-148384 A   7/1987
(Continued)

OTHER PUBLICATIONS

International Preliminary Report on Patentability dated Aug. 11, 2015 for PCT/JP2014/052756.
(Continued)

*Primary Examiner* — Pamela H Weiss
(74) *Attorney, Agent, or Firm* — Sughrue Mion, PLLC

(57) ABSTRACT

The present invention aims to provide solid particles with improved lubrication, a solid lubricant including the solid particles, and a metal member including, on the surface thereof, the solid particles or the solid lubricant. The solid particles of the present invention include base particles and carbon fluoride particles attached to surfaces of the base particles.

20 Claims, 1 Drawing Sheet

(51) Int. Cl.
*C10M 103/02* (2006.01)
*F16C 33/16* (2006.01)
*C10M 103/04* (2006.01)
*F16C 33/66* (2006.01)
*F16C 33/10* (2006.01)
*F16C 33/12* (2006.01)
*F16C 33/14* (2006.01)
*C10M 159/12* (2006.01)
*C10M 103/00* (2006.01)

(52) U.S. Cl.
CPC ....... *C10M 159/12* (2013.01); *F16C 33/1095* (2013.01); *F16C 33/121* (2013.01); *F16C 33/14* (2013.01); *F16C 33/6696* (2013.01); *C10M 2201/042* (2013.01); *C10M 2201/0423* (2013.01); *C10M 2201/061* (2013.01); *C10M 2201/066* (2013.01); *C10M 2201/0613* (2013.01); *C10M 2201/0623* (2013.01); *C10M 2201/0653* (2013.01); *C10M 2201/0663* (2013.01); *C10M 2201/1023* (2013.01); *C10M 2201/1053* (2013.01); *C10M 2205/0225* (2013.01); *C10M 2209/1033* (2013.01); *C10M 2217/0443* (2013.01); *C10N 2220/082* (2013.01); *C10N 2220/084* (2013.01); *C10N 2230/06* (2013.01); *C10N 2230/08* (2013.01); *C10N 2240/02* (2013.01); *C10N 2240/204* (2013.01); *C10N 2250/08* (2013.01); *C10N 2250/18* (2013.01); *F16C 2220/20* (2013.01)

(58) Field of Classification Search
CPC ...... C10M 2215/0666; C10M 2215/28; C10M 2215/285; C10M 133/56; C10M 105/68; C10M 113/12; C10M 125/26; C10M 2201/102; C10M 2201/1023; C10M 2201/1026; C10M 2201/105; C10M 2201/1053; C10M 2201/1056; C10M 2207/08; C10M 129/24; C10M 2201/06; C10M 2201/0613; C10M 2201/0616; C10M 2201/082; C10M 135/20; C10M 2201/065; C10M 2201/0653; C10M 2201/0656; C10M 2201/0663; C10M 2201/0666; C10M 2201/084; C10M 103/04; C10M 103/00; C10M 159/12; C10M 103/06; C10M 2201/0423; C10M 2201/061; F16C 33/6696; F16C 33/1095; F16C 33/121; F16C 33/14; F16C 2220/20; C10N 2230/08; C10N 2250/18
See application file for complete search history.

(56) References Cited

U.S. PATENT DOCUMENTS

| | | | |
|---|---|---|---|
| 4,715,972 A | | 12/1987 | Pacholke |
| 5,294,355 A | * | 3/1994 | King ..................... C10M 103/00 508/127 |
| 5,712,062 A | * | 1/1998 | Yamana ................ C01B 31/005 106/2 |
| 2004/0072075 A1 | * | 4/2004 | Tsukamoto ............ H01G 11/38 429/231.7 |
| 2005/0191505 A1 | * | 9/2005 | Akarsu .................. B01J 35/004 428/469 |
| 2008/0312111 A1 | * | 12/2008 | Malshe ................ C10M 171/06 508/155 |

FOREIGN PATENT DOCUMENTS

| | | | |
|---|---|---|---|
| JP | 62-243693 | A | 10/1987 |
| JP | 6-59449 | U | 8/1994 |
| JP | 6-256008 | A | 9/1994 |
| JP | 8-134489 | A | 5/1996 |
| JP | 9-25490 | A | 1/1997 |
| JP | 2003-49188 | A | 2/2003 |
| JP | 3948572 | B2 | 7/2007 |
| JP | 2009-523863 | A | 6/2009 |
| JP | 2011-111475 | A | 6/2011 |

OTHER PUBLICATIONS

International Search Report for PCT/JP2014/052756 dated Mar. 25, 2014.

* cited by examiner

MoS₂     Pulverized CF

CF particles

SOLID PARTICLE, SOLID LUBRICANT, AND METAL MEMBER

CROSS REFERENCE TO RELATED APPLICATIONS

This application is a National Stage of International Application No. PCT/JP2014/052756 filed Feb. 6, 2014, claiming priority based on Japanese Patent Application No. 2013-021498 filed Feb. 6, 2013, the contents of all of which are incorporated herein by reference in their entirety.

TECHNICAL FIELD

The present invention relates to solid particles, a solid lubricant, and a metal member.

BACKGROUND ART

Carbon fluoride is known as a solid lubricant (for example, see Patent Literature documents 1 and 2).

Carbon fluoride can exert excellent lubrication under specific conditions such as a high vacuum condition or a high temperature condition, but it is not superior to other solid lubricants (e.g., molybdenum disulfide) under atmospheric pressure or at low temperature.

Patent Literature 3 discloses an industrial metal article comprising a synthetic resin base and a kneaded material attached to the base, the kneaded material being a product of kneading an additive material prepared by mixing molybdenum disulfide and carbon fluoride.

CITATION LIST

Patent Literature

Patent Literature 1: JP H09-25490 A
Patent Literature 2: JP 3948572 B
Patent Literature 3: JP H06-59449 U

SUMMARY OF INVENTION

Technical Problem

Conventional solid lubricants have had room for further improvement in lubrication.

The present invention is devised in consideration of the above situation, and it aims to provide solid particles with improved lubrication, a solid lubricant comprising the solid particles, and a metal member comprising, on the surface thereof, the solid particles or the solid lubricant.

Solution to Problem

The present inventors have found that solid particles having a structure in which carbon fluoride particles are attached to surfaces of base particles show good lubrication under various conditions. Then, the inventors have also found that such solid particles can particularly suitably be applied to solid lubricants and that application of the solid particles or the solid lubricant to the surface of a metal member significantly improves the surface lubrication. Finally, the inventors have completed the present invention.

Specifically, the present invention relates to solid particles comprising base particles and carbon fluoride particles attached to surfaces of the base particles.

The base particles preferably comprise at least one selected from the group consisting of molybdenum disulfide, boron nitride, aluminum nitride, tungsten disulfide, alumina, titanium oxide, silica, silicate, polyether ether ketone, polyimide, and high density polyethylene.

In the solid particles of the present invention, the carbon fluoride particles and the base particles preferably give a ratio by mass of 60/40 to 1/99.

In the solid particles of the present invention, the carbon fluoride particles are preferably made to attach to the base particles by mechanochemical processing.

The present invention also relates to a solid lubricant comprising the solid particles.

The present invention also relates to a metal member comprising, on a surface thereof, the solid particles or the solid lubricant.

Advantageous Effects of Invention

Since the solid particles of the present invention have a structure in which the carbon fluoride particles are attached to surfaces of the base particles, it exerts significantly favorable lubrication. A solid lubricant comprising the solid particles of the present invention can also exert significantly favorable lubrication. Further, a metal member comprising, on the surface thereof, the solid particles of the present invention or the solid lubricant of the present invention has significantly favorable surface lubrication.

DESCRIPTION OF EMBODIMENTS

Figure 1:
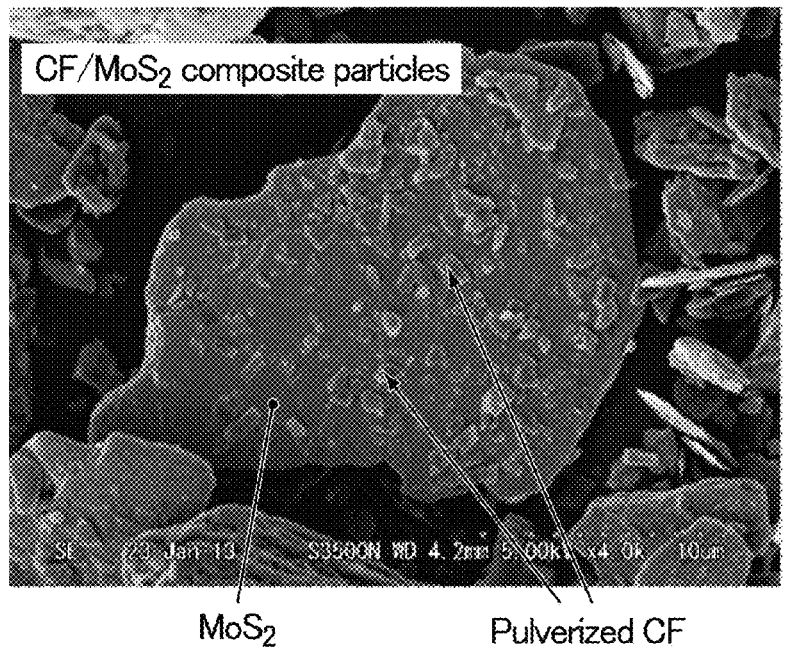
FIG. 1 is a scanning electron microscopic (SEM) image showing composite particles of carbon fluoride (CF) and molybdenum disulfide ($MoS_2$) obtained in Example 9.

The present invention will be described in detail below.

The solid particles of the present invention have a structure in which carbon fluoride particles are attached to surfaces of base particles. The solid particles having such a structure can synergistically exert the lubrication of the base particles and the lubrication of the carbon fluoride particles, so that the solid particles can achieve significantly excellent lubrication as a whole. For example, carbon fluoride has good lubrication under high unit pressure or at high temperature, whereas molybdenum disulfide or the like material for the base particles has better lubrication than carbon fluoride under low unit pressure or at low temperature. Not mere mixing but compositing of the materials can provide particles capable of exerting excellent lubrication under various conditions. In other words, the individual materials have good or poor lubrication in accordance with the unit pressure/temperature conditions, but the solid particles prepared by compositing the materials can have excellent lubrication under various conditions.

The base particles in the present invention preferably comprise at least one selected from the group consisting of molybdenum disulfide ($MoS_2$), boron nitride, aluminum nitride, tungsten disulfide, alumina, titanium oxide, silica, silicate, polyether ether ketone, polyimide, and high density polyethylene. Attachment of the carbon fluoride particles to surfaces of the base particles comprising the above compound(s) leads to a synergistic effect of the lubrication of the base particles and the lubrication of the carbon fluoride particles, so that the solid particles can exert significantly excellent lubrication as a whole. The base particles more preferably comprise at least one selected from the group consisting of molybdenum disulfide, boron nitride, aluminum nitride, tungsten disulfide, alumina, titanium oxide, and silica, and still more preferably at least one selected from the group consisting of molybdenum disulfide, boron nitride, aluminum nitride, alumina, titanium oxide, and silica.

The base particles preferably have an average particle size of 0.05 to 80 µm. Base particles having an average particle size within the above range can have good dispersibility. The lower limit of the average particle size of the base particles is more preferably 0.1 µm, and still more preferably 0.5 µm. The upper limit of the average particle size of the base particles is more preferably 60 µm, and still more preferably 50 µm.

The average particle size herein is an average value of the particle sizes of 10 particles arbitrarily selected in an electron microscopic image of the particles.

In the solid particles of the present invention, the carbon fluoride particles are attached to surfaces of the base particles. The carbon fluoride herein essentially consists of inorganic polycarbon fluoride in which a carbon atom and a fluorine atom chemically form a covalent bond.

The carbon fluoride particles preferably have an average particle size of 0.01 to 40 µm. Carbon fluoride particles having too small an average particle size tend to have difficulty in dispersion, whereas carbon fluoride particles having too large an average particle size tend to have difficulty in attaching to the target surfaces. The lower limit of the average particle size is more preferably 0.05 µm, and still more preferably 0.1 µm. The upper limit of the average particle size is more preferably 30 µm, and still more preferably 20 µm.

The shape of the carbon fluoride particles depends on the shape of the material carbon, and thus the carbon fluoride particles can have any of various shapes such as a spherical shape, a fibrous shape, and a scaly shape in accordance with the carbon material.

The carbon fluoride particles preferably have a fluorine content of 20 to 65% by weight. Carbon fluoride particles having a fluorine content within the above range can give much better lubrication to the solid particles to which the carbon fluoride particles are attached. Carbon fluoride particles having too small a fluorine content may fail to give excellent lubrication to the solid particles, whereas carbon fluoride particles having too large a fluorine content may disintegrate so that the particles may fail to keep its spherical shape and may have poor dispersibility on the base particles. The lower limit of the fluorine content is more preferably 25% by weight, and still more preferably 30% by weight. The upper limit of the fluorine content is more preferably 64% by weight, and still more preferably 63% by weight.

The fluorine content can be determined by the following method. Carbon fluoride particles are burnt in an oxygen-filled flask together with a combustion improver $Na_2O_2$ and a polyethylene film, and the hydrogen fluoride (HF) generated is made to be absorbed by water. The amount of HF generated is measured using a fluoride meter (Ion analyzer 901, Orion). The whole residue of the carbon fluoride particles is considered as carbon, and the fluorine content is determined based on the above calculated value.

The carbon fluoride particles can be produced by a known production method. For example, carbon particles are heated in the presence of fluorine gas and reacted therewith for a predetermined period of time so that the carbon particles are fluorinated, thereby producing carbon fluoride particles. The heating temperature is usually 150° C. to 600° C., preferably 200° C. to 500° C., and more preferably 250° C. to 400° C. The reaction time is usually 1 minute to 12 hours, preferably 5 minutes to 10 hours, and more preferably 10 minutes to 8 hours.

In the solid particles of the present invention, the carbon fluoride particles only need to attach to somewhere of the surfaces of the base particles. For example, the carbon fluoride particles may be scattered on surfaces of the base particles, may be attached such that they partially cover the surfaces of the base particles, or may be attached such that they completely cover the surfaces of the base particles. Alternatively, a carbon fluoride particle may be attached such that it covers multiple base particles.

The fact that the particles attached to surfaces of the base particles are carbon fluoride particles is preferably confirmed by energy dispersive X-ray spectroscopy (EDX) or electron spectroscopy for chemical analysis (ESCA).

In the case of EDX, the target particles of scanning electron microscopy (SEM) are fixed and the distribution of elements at the target site can be determined. Thus, the EDX can show the distribution of elements along the shapes of the particles on the surface. When the resulting distribution of elements confirms the presence of fluorine atoms, the carbon fluoride particles can be considered as attaching to surfaces of the base particles.

In the case of ESCA, the presence of fluorine atoms on surfaces can be confirmed by observing an increase or a decrease in the number of fluorine atoms on surfaces of the particles before and after compositing the materials. When the presence of fluorine atoms is confirmed, the carbon fluoride particles can be considered as attaching to surfaces of the base particles.

In the solid particles of the present invention, the carbon fluoride particles and the base particles give a ratio by mass (carbon fluoride particles/base particles) of preferably 60/40 to 1/99. Solid particles satisfying the ratio by mass between the carbon fluoride particles and the base particles within the above range show particularly excellent lubrication. The upper limit of the ratio by mass is more preferably 50/50, and still more preferably 40/60. The lower limit of the ratio by mass is more preferably 3/97, and still more preferably 5/95.

The solid particles of the present invention preferably have an average particle size of 0.05 to 100 µm. The lower limit of the average particle size of the solid particles is more preferably 0.1 µm, and still more preferably 0.5 µm. The upper limit of the average particle size of the solid particles is more preferably 80 µm, and still more preferably 60 µm.

The solid particles of the present invention can be produced by mixing carbon fluoride particles and base particles to which the carbon fluoride particles are to attach under a predetermined condition, and thereby making the carbon fluoride particles attach to surfaces of the base particles.

The method of attaching the carbon fluoride particles to surfaces of the base particles is preferably mechanochemical processing because the carbon fluoride particles can uniformly be dispersed on surfaces of the base particles. In other words, the solid particles of the present invention are preferably those in which the carbon fluoride particles are attached to the base particles by mechanochemical processing.

Mere mixing of the base particles and the carbon fluoride particles fails to make the carbon fluoride particles attach to surfaces of the base particles and has difficulty in uniformly dispersing the base particles and the carbon fluoride particles, causing uneven dispersion in the sliding surface. If the base particles and the carbon fluoride particles have different lubricating mechanisms, mere coexistence of the base particles and the carbon fluoride particles fails to give synergistic effects thereof.

The mechanochemical processing is a process of compositing target materials by applying a compression force, shearing force, frictional force, stretching force, or the like force to the target materials so that the target materials are affected by a high mechanical energy.

In the case of producing the solid particles of the present invention by mechanochemical processing, the base particles and the carbon fluoride particles are put into a container and a compression force, shearing force, frictional force, stretching force, or the like force is applied to the particles so that the particles are affected by a high mechanical energy, and thereby the base particles and the carbon fluoride particles are bonded to each other.

The mechanochemical processing can be performed by any device that is capable of applying a force such as a compression force, shearing force, frictional force, or stretching force, to the target materials. Examples thereof include mills and mixers. Specific examples thereof include ball mills, planetary ball mills, three roll mills, jet mills, attritors, disk mills, hammer mills, stationary mixers, rotary mixers, and combined mixers. Particularly preferred is a mixer that is designed to apply a shear/frictional force because such a mixer can give a high mixing energy, and thus makes the carbon fluoride particles attach to the base particles in a short time.

The carbon fluoride particles to be used in mechanochemical processing preferably have an average particle size of 0.01 to 50 μm. The average particle size may be chosen in accordance with the required average particle size of the carbon fluoride particles in the target solid particles. Carbon fluoride particles having too small an average particle size may show a marked tendency toward secondary coagulation, and thus they are difficult to disperse uniformly on the base particles. Carbon fluoride particles having too large an average particle size tend to have poor dispersibility on the base particles. The lower limit of the average particle size is more preferably 0.05 μm, and still more preferably 0.1 μm. The upper limit of the average particle size is more preferably 45 μm, and still more preferably 40 μm.

The base particles to be used in mechanochemical processing preferably have an average particle size of 0.05 to 100 μm. The average particle size may be chosen in accordance with the required average particle size of the base particles in the target solid particles. The lower limit of the average particle size of the base particles is more preferably 0.1 μm, and still more preferably 0.5 μm. The upper limit of the average particle size of the base particles is more preferably 80 μm, and still more preferably 60 μm.

Since the solid particles of the present invention have significantly favorable lubrication, the particles can suitably be used alone or in combination with other materials in various applications that require lubrication.

The solid particles of the present invention are useful as a solid lubricant, for example.

The present invention also relates to a solid lubricant comprising the solid particles of the present invention. The solid lubricant of the present invention may comprise the solid particles of the present invention alone, or may further comprise a different material. The solid lubricant may be a composite with a material in which the solid lubricant is dispersed. Examples of the different material include engineering plastics, greases, and adhesives.

Examples of the engineering plastics include polyoxybenzoyl polyester, polyimide, polyamide, polyamide imide, polyacetal, polycarbonate, and polyphenylene sulfide.

The solid particles and the solid lubricant of the present invention can give excellent lubrication to the surfaces of various members.

The present invention also relates to a metal member comprising, on the surface thereof, the solid particles of the present invention or the solid lubricant of the present invention.

The metal member of the present invention comprises the solid particles or the solid lubricant on at least somewhere of the surface thereof. The solid particles or the solid lubricant may be scattered on the surface, may partially cover the surface, or may completely cover the surface.

The metal member of the present invention may be formed of any metal such as iron, aluminum, SUS, copper, and titanium.

Examples of a method of applying the solid particles or the solid lubricant to the surface of the metal member include: a method utilizing a shot peening technique; a method of applying, to the surface of the metal member, an oil containing the solid particles or the solid lubricant dispersed therein; a method of applying, to the surface of the metal member, a coating containing the solid particles or the solid lubricant to form a film; a method of applying, to the surface of the metal member, a grease containing the solid particles or the solid lubricant dispersed therein; a method of applying or abrasive blasting resin or metal containing the solid particles to the surface of the metal member, and then baking the applied or sprayed resin or metal.

Particularly preferred is a method utilizing a shot peening technique, a method of applying, to the surface of the metal member, a grease containing the solid particles or the solid lubricant dispersed therein, or a method of applying, to the surface of the metal member, a coating containing the solid particles or the solid lubricant to form a film.

The shot peening is a process of spraying powder toward a target material at high pressure and high speed, thereby coating the target material.

In the case of applying an oil containing the solid particles or the solid lubricant dispersed therein to the surface of the metal member, the oil to be used here may be a mineral oil or a synthetic oil, for example.

The metal member of the present invention is excellent in surface lubrication because it comprises the aforementioned solid particles or solid lubricant. Thus, the metal member can suitably be used at sliding sites in devices for driving magnetic disks, motors for automobiles, OA equipment, engine shafts, and crankshafts, for example.

EXAMPLES

The present invention will be described hereinbelow referring to, but not limited to, examples.

The values in the examples were determined by the following methods.

(Average Particle Size)

Observation was performed using a scanning electron microscope (SEM). Any 10 particles in the SEM image were chosen and the diameters of the 10 particles were measured. Then, the average particle size thereof was calculated.

(Fluorine Content)

First, 10 mg of a sample was burnt by the oxygen flask combustion method. The decomposed gas was absorbed by 20 ml of deionized water, and the fluoride concentration in the absorption liquid was determined by a fluoride ion selective electrode method (with a fluoride meter (Ion analyzer 901, Orion)).

Example 1

Carbon fluoride particles (10 g, fluorine content: 62% by weight, average particle size: 20 μm) and molybdenum disulfide ($MoS_2$) (40 g, Aldrich, average particle size: 40.0 μm) were treated at 5000 rotations for five minutes using Nobilta (HOSOKAWA MICRON CORP.). Thereby, composite particles comprising the carbon fluoride particles which cover the molybdenum disulfide surface were obtained.

Examples 2 to 23

Composite particles comprising the carbon fluoride particles which cover surfaces of the base particles were obtained in the same manner as in Example 1 except that the type of base particles, and the type and weight of carbon fluoride particles were as shown in Table 1 or 2.

A: Carbon fluoride particles, fluorine content: 62% by weight, average particle size: 20 μm B: Carbon fluoride particles, fluorine content: 62% by weight, average particle size: 6 μm C: Carbon fluoride particles, fluorine content: 46% by weight, average particle size: 20 μm D: Carbon fluoride particles, fluorine content: 55% by weight, average particle size: 20 μm E: Carbon fluoride particles, fluorine content: 61% by weight, average particle size: 35 μm

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Carbon fluoride particles | A | A | A | A | A | A | A | A | A | B |
| Base particles (average particle size (μm)) | $MoS_2$ (40.0) | $MoS_2$ (40.0) | $MoS_2$ (20.0) | $MoS_2$ (10.0) | $MoS_2$ (3.5) | $MoS_2$ (2.0) | $MoS_2$ (1.0) | $MoS_2$ (3.5) | $MoS_2$ (20.0) | $MoS_2$ (3.5) |
| Weight of base particles (g) | 40 | 40 | 40 | 40 | 40 | 40 | 40 | 40 | 40 | 40 |
| Weight of carbon fluoride particles (g) | 10 | 5 | 10 | 10 | 10 | 10 | 10 | 40 | 2 | 5 |
| Number of rotations in treatment (rotations) | 5000 | 5000 | 5000 | 5000 | 5000 | 5000 | 5000 | 5000 | 5000 | 5000 |
| Treatment time (min) | 5 | 5 | 5 | 5 | 5 | 5 | 5 | 5 | 5 | 5 |
| Average particle size of carbon fluoride particles in composite particles (μm) | 2 | 2 | 3 | 2 | 0.5 | 0.5 | 0.2 | 0.2 | 2 | 0.2 |
| Average particle size of base particles in composite particles (μm) | 31 | 32 | 15 | 7 | 3 | 2 | 1 | 3 | 16 | 3 |
| Average particle size of composite particles (μm) | 31 | 32 | 15 | 7 | 3 | 2 | 1 | 3 | 16 | 3 |

TABLE 2

|  | Example 11 | Example 12 | Example 13 | Example 14 | Example 15 | Example 16 | Example 17 |
|---|---|---|---|---|---|---|---|
| Carbon fluoride particles | C | D | D | D | D | A | E |
| Base particles (average particle size (μm)) | $MoS_2$ (3.5) | $MoS_2$ (3.5) | $MoS_2$ (3.5) | $MoS_2$ (3.5) | $MoS_2$ (40.0) | $MoS_2$ (40.0) | $MoS_2$ (40.0) |
| Weight of base particles (g) | 40 | 40 | 40 | 40 | 40 | 40 | 40 |
| Weight of carbon fluoride particles (g) | 5 | 5 | 10 | 20 | 40 | 40 | 10 |
| Number of rotations in treatment (rotations) | 5000 | 5000 | 5000 | 5000 | 5000 | 5000 | 5000 |
| Treatment time (min) | 5 | 5 | 5 | 5 | 5 | 5 | 5 |
| Average particle size of carbon fluoride particles in composite particles (μm) | 0.2 | 0.3 | 0.3 | 0.4 | 1 | 1 | 1 |
| Average particle size of base particles in composite particles (μm) | 3 | 3 | 3 | 3 | 26 | 27 | 26 |
| Average particle size of composite particles (μm) | 3 | 3 | 3 | 3 | 28 | 27 | 26 |

TABLE 2-continued

|  | Example 18 | Example 19 | Example 20 | Example 21 | Example 22 | Example 23 |
|---|---|---|---|---|---|---|
| Carbon fluoride particles | E | E | E | A | A | A |
| Base particles (average particle size (μm)) | $MoS_2$ (40.0) | $MoS_2$ (20.0) | $MoS_2$ (10.0) | $Al_2O_3$ (20.0) | $TiO_2$ (20.0) | AlN (20.0) |
| Weight of base particles (g) | 40 | 40 | 40 | 40 | 40 | 40 |
| Weight of carbon fluoride particles (g) | 5 | 10 | 10 | 10 | 10 | 10 |
| Number of rotations in treatment (rotations) | 5000 | 5000 | 5000 | 5000 | 5000 | 5000 |
| Treatment time (min) | 5 | 5 | 5 | 5 | 5 | 5 |
| Average particle size of carbon fluoride particles in composite particles (μm) | 0.5 | 0.4 | 1 | 1 | 0.8 | 0.8 |
| Average particle size of base particles in composite particles (μm) | 25 | 16 | 8 | 18 | 19 | 16 |
| Average particle size of composite particles (μm) | 25 | 16 | 8 | 18 | 19 | 16 |

FIG. 1 is a scanning electron microscopic (SEM) image showing the composite particles of carbon fluoride (CF) and molybdenum disulfide ($MoS_2$) obtained in Example 9. FIG. 1 shows that the pulverized carbon fluoride particles are attached to the surface of a molybdenum disulfide particle that serves as a base particle.

For the composite particles, in general, particles having a lower cleavability serve as base particles and particles having a higher cleavability are combined onto surfaces of the base particles. In the case of composite particles of carbon fluoride and one of the various compounds, the carbon fluoride has a higher cleavability. Thus, the carbon fluoride is combined onto surfaces of the composite particles. When the proportion by mass of the carbon fluoride is 60% by mass or less, much more carbon fluoride particles are attached to surfaces of the composite particles.

Comparative Examples 1 and 2

Comparative Examples 1 and 2 used molybdenum disulfide (Aldrich, average particle size: 40 μm) and molybdenum disulfide (Aldrich, average particle size: 3.5 μm), respectively.

Comparative Example 3

A mixture of molybdenum disulfide particles and carbon fluoride particles was obtained in the same manner as in Example 1 except that the molybdenum disulfide particles and the carbon fluoride particles were mixed not by mechanochemical processing.

Figure 2:
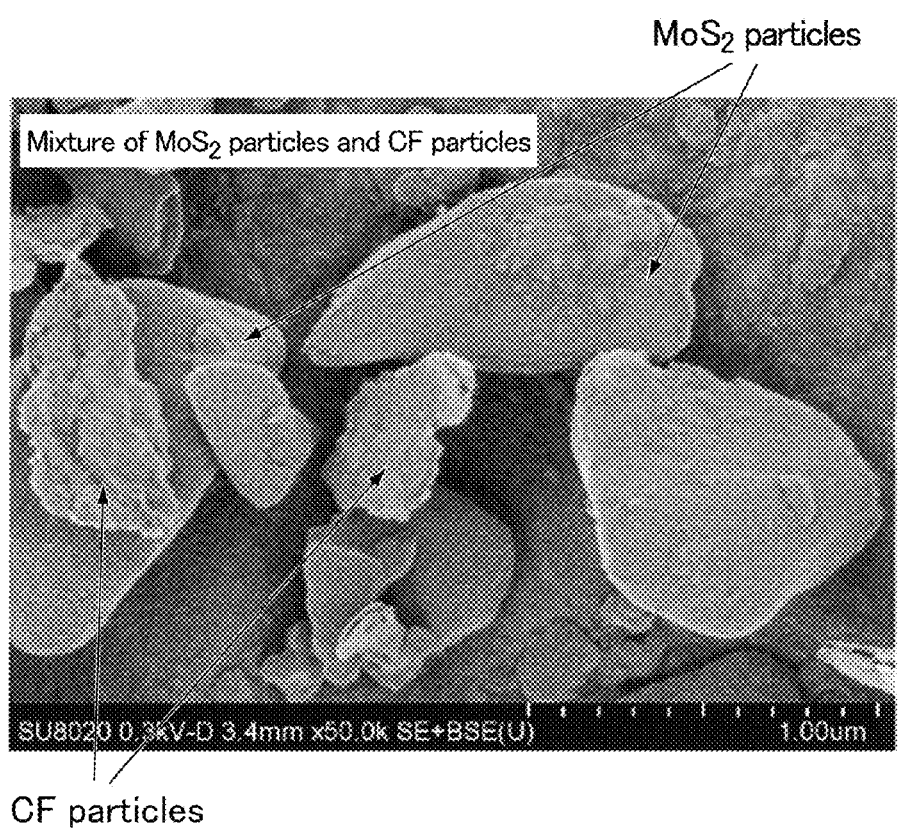
FIG. 2 is a scanning electron microscopic (SEM) image showing a mixture of molybdenum disulfide ($MoS_2$) particles and carbon fluoride (CF) particles obtained in Comparative Example 3.

FIG. 2 is a scanning electron microscopic (SEM) image showing the mixture of molybdenum disulfide ($MoS_2$) particles and carbon fluoride (CF) particles obtained in Comparative Example 3. FIG. 2 shows that mere mixing provides insufficient cleavage of the carbon fluoride particles and that the carbon fluoride particles exist as coarse particles separately from molybdenum disulfide particles.

The test and measurement methods in the present invention are as follows.
(Shot Peening Test)

The composite particles obtained in Examples 1, 2, 5, 12, 13, 15, 17, and 19, the molybdenum disulfide obtained in Comparative Examples 1 and 2, and the mixture obtained in Comparative. Example 3 were each applied to a base (aluminum plate) to be peened at an angle of 45° using commercial shot peening equipment. Thereby, a solid lubricating layer was formed.
(Abrasion Test)

The abrasion test on the resulting solid lubricating layer was performed using a disk-like holder fixedly supporting blades each of which has a round tip and is made of a quenched and tempered material SKH51 (hardness: Hv750 to Hv850), and a disk-like base having the solid lubricating layer formed on the surface thereof (outer diameter: φ44 mm, inner diameter: Φ32 mm). The holder fixedly supporting blades has three blades (tip: R6 mm, width: 4 mm, depth: 5 mm, length: 11 mm) fixed thereon at the positions where the radius of gyration is 19 mm.

The blades on the holder and the disk-like base were slid in the atmosphere under a dry condition without oil at a load of 70 kgf and a sliding speed of 0.5 m/s so as to bring the tips of the blades and the solid lubricating layer into sliding contact with each other. The time when the coefficient of friction suddenly rose was defined as fatigue life. The test temperature was 160° C. Table 3 shows the results.

TABLE 3

|  | Example 1 | Example 2 | Example 5 | Example 12 | Example 13 | Example 15 | Example 17 | Example 19 | Comparative Example 1 | Comparative Example 2 | Comparative Example 3 |
|---|---|---|---|---|---|---|---|---|---|---|---|
| Fatigue life (h) | 1.2 | 1.1 | 1.2 | 1.0 | 1.2 | 1.4 | 1.3 | 1.1 | 0.4 | 0.4 | 0.4 |

The results show that the composite particles are excellent in slidability at high temperature and high unit pressure so that it has an improved fatigue life in comparison with the non-composite particles consisting of molybdenum disulfide alone and the particles prepared not by mechanochemical processing but by mere mixing.

(Preparation of Coating and Formation of Solid Lubricating Layer)

First, 10% by weight of the composite particles produced in Example 1, 2, 5, 12, 13, 15, 17, or 19, the molybdenum disulfide produced in Comparative Example 1 or 2, or the mixture produced in Comparative Example 3 was mixed with a polyimide precursor solution (U-VARNISH-A, Ube Industries, Ltd., solid content: 20% by weight). The mixture was applied to an aluminum base such that the mixture layer had a thickness of 80 µm, and then dried at 120° C. for 20 minutes. Further, the dried mixture was heated at 300° C. for one hour, thereby forming a solid lubricating layer.

The resulting solid lubricating layer was subjected to the same abrasion test as mentioned above. Table 4 shows the results.

TABLE 4

| | Example 1 | Example 2 | Example 5 | Example 12 | Example 13 | Example 15 | Example 17 | Example 19 | Comparative Example 1 | Comparative Example 2 | Comparative Example 3 |
|---|---|---|---|---|---|---|---|---|---|---|---|
| Fatigue life (h) | 1.3 | 1.0 | 1.2 | 0.9 | 1.4 | 1.5 | 1.2 | 1.2 | 0.5 | 0.5 | 0.6 |

The results show that the solid lubricating layer comprising the composite particles has better properties than the solid lubricating layer comprising the non-composite particles consisting of molybdenum disulfide alone or the particles prepared not by mechanochemical processing but by mere mixing.

The invention claimed is:

1. Solid particles, comprising:
   base particles, and
   carbon fluoride particles attached to surfaces of the base particles,
   wherein the carbon fluoride particles are attached to and form a composite with the base particles by mechanochemical processing,
   an average particle size of the base particles in the solid particles is 1 to 80 µm,
   an average particle size of the carbon fluoride particles in the solid particles is 0.01 to 40 µm, and
   the base particles comprise molybdenum disulfide.

2. The solid particles according to claim 1, wherein the carbon fluoride particles and the base particles give a ratio by mass of 60/40 to 1/99.

3. A solid lubricant, comprising:
   the solid particles according to claim 1, and
   a material different than the solid particles.

4. A metal member comprising, on a surface thereof, the solid particles according to claim 1.

5. A metal member comprising, on a surface thereof, the solid lubricant according to claim 3.

6. The solid particles according to claim 1, wherein the average particle size of the base particles in the solid particles is 2 to 50 µm.

7. The solid particles according to claim 1, wherein the average particle size of the carbon fluoride particles in the solid particles is 0.1 to 20 µm.

8. The solid particles according to claim 1, wherein the average particle size of the solid particles is 1.01 to 100 µm.

9. The solid particles according to claim 1, wherein the mechanochemical processing is a process of compositing the carbon fluoride particles and base particles by applying at least one force selected from a compression force, a shearing force, a frictional force and a stretching force.

10. The solid lubricant of claim 3, wherein the material different than the solid particles comprises at least one selected from the group consisting of a plastic, a grease and an adhesive.

11. The solid particles according to claim 1, wherein the average particle size of the base particles in the solid particles is 3 to 50 µm.

12. The solid particles according to claim 1, wherein the average particle size of the base particles in the solid particles is 7 to 50 µm.

13. The solid particles according to claim 1, wherein the average particle size of the base particles in the solid particles is 15 to 50 µm.

14. The solid particles according to claim 1, wherein the average particle size of the base particles in the solid particles is 25 to 50 µm.

15. The solid particles according to claim 1, wherein the average particle size of the carbon fluoride particles in the solid particles is less than the average particle size of the base particles in the solid particles.

16. The solid particles according to claim 6, wherein the average particle size of the carbon fluoride particles in the solid particles is less than the average particle size of the base particles in the solid particles.

17. The solid particles according to claim 11, wherein the average particle size of the carbon fluoride particles in the solid particles is less than the average particle size of the base particles in the solid particles.

18. The solid particles according to claim 12, wherein the average particle size of the carbon fluoride particles in the solid particles is less than the average particle size of the base particles in the solid particles.

19. The solid particles according to claim 13, wherein the average particle size of the carbon fluoride particles in the solid particles is less than the average particle size of the base particles in the solid particles.

20. The solid particles according to claim 1, wherein the average particle size of the carbon fluoride particles in the solid particles is 0.2 to 3 µm.

* * * * *